(12) United States Patent
Lee

(10) Patent No.: US 7,764,027 B2
(45) Date of Patent: Jul. 27, 2010

(54) DIMMABLE CONTROL CIRCUIT

(76) Inventor: Ching Chuan Lee, 6f-3, No. 123, Lane 235, Baociao Rd., Sindian City, Taipei Country (TW)

( * ) Notice: Subject to any disclaimer, the term of this patent is extended or adjusted under 35 U.S.C. 154(b) by 257 days.

(21) Appl. No.: 12/126,003

(22) Filed: May 23, 2008

(65) Prior Publication Data

US 2009/0267532 A1  Oct. 29, 2009

(30) Foreign Application Priority Data

Apr. 29, 2008  (CN)  .................... 2008 2 0104904 U

(51) Int. Cl.
*H05B 41/36* (2006.01)
(52) U.S. Cl. .................. 315/307; 315/291; 315/224; 315/DIG. 4; 315/209 R
(58) Field of Classification Search ................. 315/301, 315/291, 224, 209 R, DIG. 4, DIG. 5, DIG. 7
See application file for complete search history.

(56) References Cited

U.S. PATENT DOCUMENTS

| 6,175,195 | B1 * | 1/2001 | Janczak et al. | ......... 315/DIG. 4 |
| 6,376,999 | B1 * | 4/2002 | Li et al. | ...................... 315/307 |
| 6,407,511 | B1 * | 6/2002 | Yang et al. | ................... 315/224 |
| 7,221,107 | B2 * | 5/2007 | Melis | ......................... 315/291 |
| 7,259,527 | B2 * | 8/2007 | Foo | ......................... 315/DIG. 4 |
| 7,414,372 | B2 * | 8/2008 | Ribarich | ...................... 315/307 |
| 2005/0179405 | A1 * | 8/2005 | Wang | .......................... 315/307 |

* cited by examiner

*Primary Examiner*—Douglas W Owens
*Assistant Examiner*—Ephrem Alemu
(74) *Attorney, Agent, or Firm*—Ming Chow; Sinorica, LLC

(57) ABSTRACT

A dimmable control circuit, having an ac power source; a transformer; a rectifier circuit; a dimmable control chip; a voltage dividing circuit; a dimmable switch; a first resistor; a second resistor; and a half bridge power driving circuit, capable of outputting signals to drive a fluorescent tube, characterized in that the said dimmable switch has a coactive variable resistor connected in parallel with the first resistor and the second resistor, and both the first resistor and the second resistor have the negative resistance temperature coefficient to achieve low temperature startup and high temperature operation.

8 Claims, 1 Drawing Sheet

DIMMABLE CONTROL CIRCUIT

BACKGROUND OF THE INVENTION

1. Field of the Invention

The present invention relates to a dimmable control circuit, and more particularly to a dimmable control circuit having a first resistor and a second resistor, both with the negative resistance temperature coefficient, to achieve low temperature startup and high temperature operation.

2. Description of the Related Art

At present, the common dimmable electronic ballast usually works on the brightness control of the fluorescent tube in an order from dark to bright. That is, when the user turns on the power switch having a coactive variable resistor, the ballast will first work in low resistance of the variable resistor causing dim brightness of the tube, and then work in higher resistance of the variable resistor causing the tube brighter as the user turns the variable resistor clockwise. However, there exist flaws when the ballast activates the tube in low resistance of the variable resistor.

Besides, the dimmable control chip of the common electronic ballast, taking the PHILIPS's chip UBA2014 as an example, but not limited thereto, usually connects its reference voltage terminal with a set of normal resistors with positive resistance temperature coefficient to produce a corresponding reference voltage ($V_{REF}$). When the switch is just turned on, due to the extremely low resistance of the variable resistor, the input voltage to the $V_{REF}$ terminal will be lowered down, causing the operating frequency of the UBA2014 to rise up to about 80 KHz and providing the tube with the minimum power. When the resistance of the variable resistor is turned to its maximum around 10 KΩ, the input voltage to the $V_{REF}$ terminal will go high, causing the operating frequency of the UBA2014 to go down to about 40 KHz and providing the tube with the maximum power.

However, when the surrounding temperature goes down to, for example 0° C., the resistance of the known voltage dividing resistors having positive resistance temperature coefficient goes down as well, causing the reference voltage too low to activate the UBA2014. Further more, when the surrounding temperature goes up, the resistance of the known voltage dividing resistors having positive resistance temperature coefficient goes up as well, causing the reference voltage to rise up and as a result the output operating frequency of the UBA2014 will be lowered down, and the power consumption of the tube will increase. These are cons of the known dimmable control circuits.

SUMMARY OF THE INVENTION

An objective of the present invention is to provide a novel dimmable control circuit to overcome the flaws of the known ones. The novel dimmable control circuit includes: an ac power source; a transformer; a rectifier circuit; a dimmable control chip; a voltage dividing circuit; a dimmable switch; a first resistor; a second resistor; and a half bridge power driving circuit, capable of outputting signals to drive a fluorescent tube, characterized in that said dimmable switch has a coactive variable resistor connected in parallel with said first resistor and said second resistor, and both said first resistor and said second resistor have the negative resistance temperature coefficient to achieve low temperature startup and high temperature protection.

Said ac power source is rated as AC120~230V.

Said rectifier circuit can be a half wave or full wave rectifier circuit.

Said dimmable control chip can be one like UBA2014.

Said first resistor and second resistor can be of the type as thermistors.

Said voltage dividing circuit further comprises a first resistor, a second resistor, a third resistor, a fourth resistor, and a first transistor, wherein said first resistor has its first terminal coupled to the VDD terminal of said dimmable control chip, and its second terminal connected to where the first terminal of said second resistor meets the first terminal of said dimmable switch; said second resistor has its second terminal connected to the second terminal of said first transistor; said third resistor has its first terminal connected to where the second terminal of said second resistor meets the second terminal of said first transistor, and its second terminal coupled to ground; said fourth resistor has its first terminal coupled to the VDD terminal of said dimmable control chip, and its second terminal connected to the first terminal of said first transistor; and the third terminal of said first transistor meets the second terminal of said dimmable switch which is coupled to ground.

Said first transistor can be the type as an NPN transistor, of which the first terminal can be collector, the second terminal can be base, and the third terminal can be emitter.

Said half bridge power driving circuit further includes a second transistor and a third transistor that can be the field effect type.

To make it easier for our examiner to understand the objective of the invention, its structure, innovative features, and performance, we use a preferred embodiment together with the attached drawings for the detailed description of the invention.

DETAILED DESCRIPTION OF THE PREFERRED EMBODIMENTS

Figure 1:
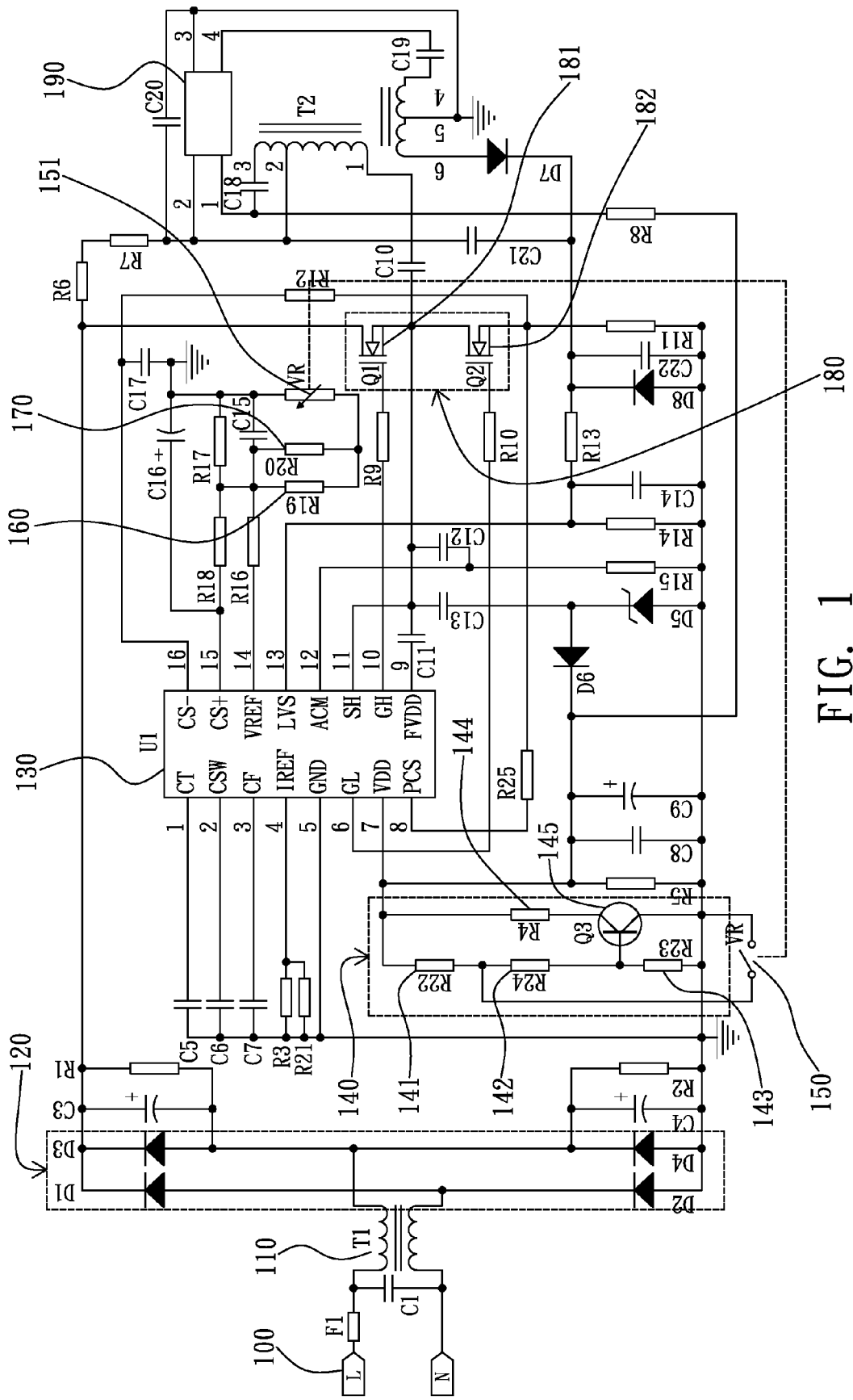
FIG. 1 is a circuit drawing illustrating one implementation of the present invention.

FIG. 1 shows one possible implementation of the present invention. As shown in the drawing, the dimmable control circuit comprises an ac power source 100, a transformer 110, a rectifier circuit 120, a dimmable control chip 130, a voltage dividing circuit 140, a dimmable switch 150, a first resistor 160, a second resistor 170, and a half bridge power driving circuit 180.

Wherein, said ac power source 100 can be rated as but not limited to AC120~230V.

Said transformer 110, coupled to said ac power source 100, is capable of stepping down the amplitude of said ac power source 100, and then delivers the stepped down ac power to said rectifier circuit 120 for rectification.

Said rectifier circuit 120, which can be but not limited to a half wave or full wave rectifier circuit, is capable of converting the stepped down ac power from said transformer 110 to dc power, which is then filtered to be the power supply of said dimmable control chip 130, voltage dividing circuit 140, and half bridge power driving circuit 180.

Said dimmable control chip 130, which can be but not limited to UBA2014, coupled to said rectifier circuit 120, has one reference voltage input terminal ($V_{REF}$) and a pair of differential driving signal output terminals (GH,GL), and the operation principle of UBA2014 can be found in the manual of the vendor so is not going to be addressed here.

Said voltage dividing circuit 140 further comprises a first resistor 141, a second resistor 142, a third resistor 143, a fourth resistor 144, and a first transistor 145, wherein said first resistor 141 has its first terminal coupled to the VDD terminal of said dimmable control chip 130, and its second terminal connected to where the first terminal of said second resistor 142 meets the first terminal of said dimmable switch 150; said second resistor 142 has its second terminal connected to the second terminal of said first transistor 141; said third resistor 143 has its first terminal connected to where the second terminal of said second resistor 142 meets the second terminal of said first transistor 145, and its second terminal coupled to ground; said fourth resistor 144 has its first terminal coupled to the VDD terminal of said dimmable control chip 130, and its second terminal connected to the first terminal of said first transistor 145; the third terminal of said first transistor 145 meets the second terminal of said dimmable switch 150 which is coupled to ground, and said first resistor 141, second resistor 142, third resistor 143, and fourth resistor 144 can be normal resistors having positive resistance temperature coefficient; said first transistor 145 can be but not limited to the type as a NPN transistor, of which the first terminal can be but not limited to collector, the second terminal can be but not limited to base, and the third can be but not limited to emitter.

Said dimmable switch 150, shunting between the third terminal of said first transistor 145 and the first terminal of said second resistor 142, and having a coactive variable resistor 151 connected in parallel with said first resistor 160 and second resistor 170, is capable of starting up the dimmable control circuit and tuning the brightness of the tube, and because said dimmable switch 150 is located at the low dc voltage side, it doesn't need UL verification, so a normal switch can be used to reduce the cost.

Said first resistor 160 and second resistor 170, which have the negative resistance temperature coefficient and can be but not limited to the type as thermistors, are connected in parallel with said variable resistor 151, and then shunt the reference voltage input terminal to control the output operation frequency of said dimmable control chip 130.

Said half bridge power driving circuit 180 further includes a second transistor 181 and a third transistor 182 that can be the field effect type and are controlled by the differential output driving signal (GH,GL) from said dimmable control chip 130 to activate the tube 190, wherein the portion of activating the tube is a known one, so it is not going to be addressed here.

The principle of the present novel dimmable control circuit is: when the surrounding temperature goes down to, for example 0° or even −5°, the resistance of said first resistor 160 and second resistor 170 having negative resistance temperature coefficient will increase, causing the reference voltage to rise up to activate said dimmable control chip 130; further more, when the surrounding temperature goes up, the resistance of said first resistor 160 and second resistor 170 having negative resistance temperature coefficient will decrease, causing the reference voltage to go down and as a result the output operating frequency of the UBA2014 will increase and the output power will be pulled down to achieve temperature compensation and high temperature protection.

Besides, the present novel dimmable control circuit can match with different types of tubes due to the fact that said first resistor 160 and second resistor 170 having negative resistance temperature coefficient can activate the circuit in low voltage.

Besides, the present novel dimmable control circuit has better effect in tuning the brightness of the tubes, for example 10%~90%, due to the fact that said first resistor 160 and second resistor 170 having negative resistance temperature coefficient can activate the circuit in low voltage, and when it is in low brightness, for example 10%, the present novel dimmable control circuit works much more easily than the known ones.

Therefore, through the practice of the present invention, a dimmable control circuit with minimum cost, capable of low temperature startup and high temperature operation, is achieved.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance than the conventional structure and further complies with the patent application requirements and is submitted to the Patent and Trademark Office for review and granting of the commensurate patent rights.

What is claimed is:

1. A dimmable control circuit, comprising: an ac power source; a transformer; a rectifier circuit; a dimmable control chip; a voltage dividing circuit; a dimmable switch; a first resistor; a second resistor; and a half bridge power driving circuit, capable of outputting signals to drive a fluorescent tube, characterized in that said dimmable switch has a coactive variable resistor connected in parallel with said first resistor and said second resistor, and both said first resistor and said second resistor have the negative resistance temperature coefficient to achieve low temperature startup and high temperature operation.

2. The dimmable control circuit as claimed in claim 1, wherein said ac power source is rated as AC120~230V.

3. The dimmable control circuit as claimed in claim 1, wherein said rectifier circuit is a half wave or full wave rectifier circuit.

4. The dimmable control circuit as claimed in claim 1, wherein said dimmable control chip is UBA2014.

5. The dimmable control circuit as claimed in claim 1, wherein said first resistor and second resistor are thermistors.

6. The dimmable control circuit as claimed in claim 1, wherein said voltage dividing circuit further comprises a first resistor, a second resistor, a third resistor, a fourth resistor, and a first transistor, wherein said first resistor has its first terminal coupled to the VDD terminal of said dimmable control chip, and its second terminal connected to where the first terminal of said second resistor meets the first terminal of said dimmable switch; said second resistor has its second terminal connected to the second terminal of said first transistor; said third resistor has its first terminal connected to where the second terminal of said second resistor meets the second terminal of said first transistor, and its second terminal coupled to ground; said fourth resistor has its first terminal coupled to the VDD terminal of said dimmable control chip, and its second terminal connected to the first terminal of said first transistor; and the third terminal of said first transistor meets the second terminal of said dimmable switch which is coupled to ground.

7. The dimmable control circuit as claimed in claim 6, wherein said first transistor can be the type as an NPN transistor, of which the first terminal can be collector, the second terminal can be base, and the third can be emitter.

8. The dimmable control circuit as claimed in claim 1, wherein said half bridge power driving circuit further includes a second transistor and a third transistor that can be field effect transistors.

* * * * *